United States Patent
Ljøsne

(10) Patent No.: US 12,403,985 B2
(45) Date of Patent: Sep. 2, 2025

(54) PEDALLY PROPELLED VEHICLE DRIVE SYSTEM

(71) Applicant: CA TECHNOLOGY SYSTEMS AS, Oslo (NO)

(72) Inventor: Knut Tore Ljøsne, Oslo (NO)

(73) Assignee: MONT INVEST 30 AS, Oslo (NO)

( * ) Notice: Subject to any disclaimer, the term of this patent is extended or adjusted under 35 U.S.C. 154(b) by 614 days.

(21) Appl. No.: 17/786,827

(22) PCT Filed: Dec. 16, 2020

(86) PCT No.: PCT/NO2020/050317
§ 371 (c)(1),
(2) Date: Jun. 17, 2022

(87) PCT Pub. No.: WO2021/125972
PCT Pub. Date: Jun. 24, 2021

(65) Prior Publication Data
US 2023/0015424 A1    Jan. 19, 2023

(30) Foreign Application Priority Data
Dec. 19, 2019   (NO) .................................. 20191502

(51) Int. Cl.
| | |
|---|---|
| B62K 25/30 | (2006.01) |
| B62K 3/02 | (2006.01) |
| B62K 25/04 | (2006.01) |
| B62M 6/55 | (2010.01) |
| B62M 9/16 | (2006.01) |
| B62M 11/14 | (2006.01) |

(52) U.S. Cl.
CPC .............. *B62M 11/14* (2013.01); *B62M 6/55* (2013.01); *B62M 9/16* (2013.01)

(58) Field of Classification Search
CPC .......... B62M 11/14; B62M 6/55; B62M 9/16; B62M 25/08; B62M 9/02; B62M 25/30
USPC ........................................................ 180/206.4
See application file for complete search history.

(56) References Cited

U.S. PATENT DOCUMENTS

| | | |
|---|---|---|
| 5,836,414 A | 11/1998 | Seto et al. |
| 7,753,157 B1 | 7/2010 | Woods |
| 8,777,791 B1 | 7/2014 | Hino et al. |

(Continued)

FOREIGN PATENT DOCUMENTS

| | | |
|---|---|---|
| CN | 102161369 A | 8/2011 |
| CN | 104235264 A | 12/2014 |

(Continued)

OTHER PUBLICATIONS

International Search Report, issued in PCT/NO2020/050317, dated Mar. 12, 2021.

(Continued)

*Primary Examiner* — Alentin Neacsu
*Assistant Examiner* — Nabin Kumar Sharma
(74) *Attorney, Agent, or Firm* — Birch, Stewart, Kolasch & Birch, LLP

(57) ABSTRACT

A pedally propelled vehicle drive train includes a housing, a crankshaft, an internal multi-speed gear with co-axial input and output shafts, and an electric motor with an output shaft. The crankshaft, the input and output shafts of the internal multi-speed gear and the output shaft of the electric motor are all arranged in parallel.

19 Claims, 3 Drawing Sheets

(56) References Cited

U.S. PATENT DOCUMENTS

| | | |
|---|---|---|
| 10,035,561 B2 | 7/2018 | Spaggiari |
| 2005/0176538 A1* | 8/2005 | Morita ............... B62M 9/16 |
| | | 474/136 |
| 2008/0121452 A1* | 5/2008 | Bon ............... B62M 6/55 |
| | | 475/331 |
| 2011/0201468 A1 | 8/2011 | Yang |
| 2013/0032425 A1* | 2/2013 | Lee ............... B62K 19/34 |
| | | 180/220 |
| 2013/0095971 A1 | 4/2013 | Hino et al. |
| 2015/0080163 A1 | 3/2015 | Bang |
| 2015/0101874 A1 | 4/2015 | Getta et al. |
| 2015/0360748 A1* | 12/2015 | Laprade ............... B62M 6/55 |
| | | 180/206.7 |
| 2016/0107721 A1 | 4/2016 | Urabe et al. |
| 2016/0288872 A1* | 10/2016 | Shahana ............... B62M 6/55 |
| 2017/0151999 A1* | 6/2017 | Kinpara ............... B62K 21/26 |
| 2017/0217538 A1 | 8/2017 | Yamamoto |
| 2018/0370591 A1 | 12/2018 | Denninger et al. |
| 2019/0031278 A1 | 1/2019 | Lauer |
| 2019/0277391 A1* | 9/2019 | Yoshimura et al. .. F16H 57/021 |
| 2020/0198729 A1* | 6/2020 | Tsutsui ............... B62M 6/55 |

FOREIGN PATENT DOCUMENTS

| | | |
|---|---|---|
| CN | 104837722 A | 8/2015 |
| CN | 105523138 A | 4/2016 |
| CN | 105939924 A | 9/2016 |
| EP | 3 012 181 A1 | 4/2016 |
| WO | WO 2012/128639 A1 | 9/2012 |
| WO | WO 2018/219597 A1 | 12/2018 |
| WO | WO 2020/130841 A1 | 6/2020 |

OTHER PUBLICATIONS

Written Opinion of the International Searching Authority, issued in PCT/NO2020/050317, dated Mar. 12, 2021.

* cited by examiner

PEDALLY PROPELLED VEHICLE DRIVE SYSTEM

TECHNICAL FIELD

The present invention relates to a drive system for pedally propelled vehicles, and more specifically hybrid drive systems comprising an electric motor where energy transmitted to the wheels can be delivered by a rider, by the electric motor, or a combination of the two.

BACKGROUND

A number of different so-called pedelecs have been developed over the last decades, where some of them have electric motors in either the front or the back wheel. More and more pedelecs now have an electric motor close to the crankshaft, due to advantages related to weight distribution and possibility for close integration with the battery and frame.

However, a number of issues still remain to be solved with present crank drives. One of them is the need for long term reliability and reduced maintenance costs.

Only a few crank systems with integrated electric motor and multi-speed gear have been disclosed. Most of them suffer from heavy weight and low performance, which makes them applicable only for a limited number of pedally propelled vehicle applications.

U.S. Pat. No. 5,836,414 A discloses a manpower-assisting power apparatus equipped with a differential gear mechanism preferably comprising a pedal drive bevel gear, a motor drive bevel gear, and a pair of corresponding small bevel gears driving a rotary output member.

US2017217538 A1 discloses a controller that can be mounted on a bicycle including a first transmission having at least two shift stages and configured to change a ratio of rotation of a wheel to rotation of a crank, a motor that provides assistance to human power input to the crank, and a second transmission configured to transmit a rotation force from the motor to a power transmission path extending from the crank to the wheel without changing the ratio of the rotation of the wheel to the rotation of the crank.

EP3012181 A1 discloses a mid-motor drive system for an electric bicycle, which includes a left shell (1), a right shell (2), a motor assembly (3), a gear reduction apparatus (4), a torque sensor (5), a central shaft (7), a controller (8), and a crankset (9), and further includes a planetary gear increase apparatus (6).

US2015080163 A1 discloses transmission comprising: a first driving source configured to provide a rotational force and having a first input shaft: a second driving source configured to provide the rotational force and having a second input shaft: a planetary gear unit including a sun gear, a planetary gear and a ring gear, two of the sun gear, the planetary gear and the ring gear being connected to each of the first input shaft and the second input shaft, and the remaining one being connected to an output shaft: a first one-way clutch disposed between the first driving source and the planetary gear unit; and a second one-way clutch disposed between the second driving source and the planetary gear unit, wherein the first direction and the second direction are set such that the output shaft of the planetary gear unit is rotated in the same direction.

US2018370591A1 discloses a system for assisting a user in moving a device relative to a structure comprises a magnetorheological (MR) fluid actuator unit including at least one torque source and at least one MR fluid clutch apparatus having an input coupled to the at least one torque source to receive torque from the at least one torque source, the MR fluid clutch apparatus controllable to transmit a variable amount of assistance force via an output thereof.

WO2012128639A1 and WO2020130841 disclose multi-speed gear systems for a pedally propelled vehicle.

SUMMARY OF THE INVENTION

The present invention as claimed solves a number of the problems associated with present crank drives.

In some embodiments the invention is a compact, integrated pedally propelled drive train system comprising both the crank shaft, a motor and an internal multi-speed gear In some embodiments the torque is limited. By reducing the peak torque from the crank shaft to the drive components, the drive train components can be made smaller and lighter. For the vehicles in question the weight is of great importance for the driving experience and energy consumption. Further, the price may be reduced.

EMBODIMENTS OF THE INVENTION

In the following description, various examples and embodiments of the invention are set forth in order to provide the skilled person with a more thorough understanding of the invention. The specific details described in the context of the various embodiments and with reference to the attached drawings are not intended to be construed as limitations. Rather, the scope of the invention is defined in the appended claims.

The embodiments described below are numbered. In addition, dependent embodiments defined in relation to the numbered embodiments are described. Unless otherwise specified, any embodiment that can be combined with one or more numbered embodiments may also be combined directly with any of the dependent embodiments of the numbered embodiment(s) referred to.

Figure 1:
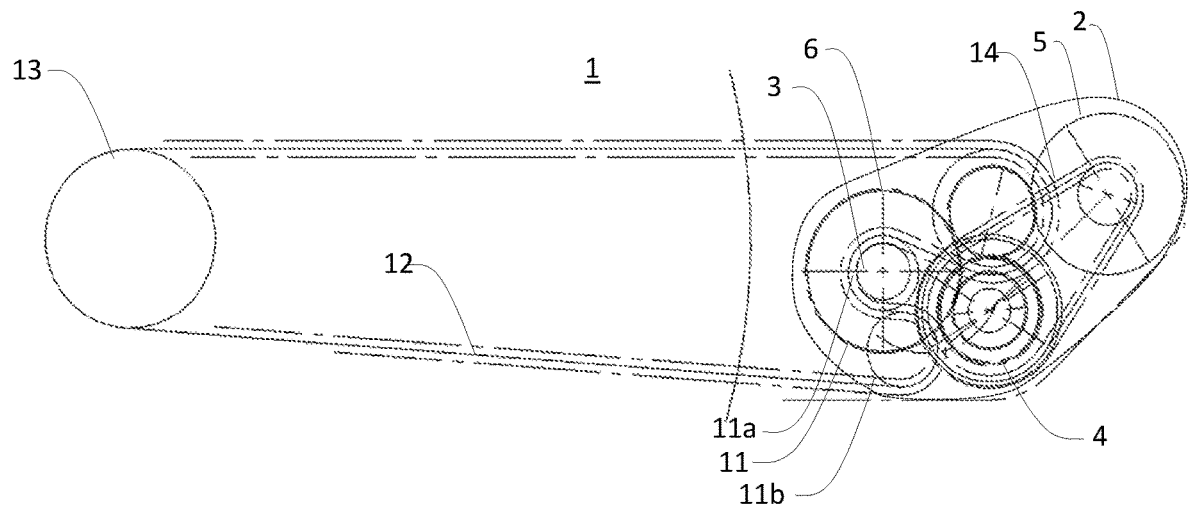
FIG. 1 illustrates in a diagrammatic side view the vehicle drive system according to an embodiment of the invention.
Figure 2:
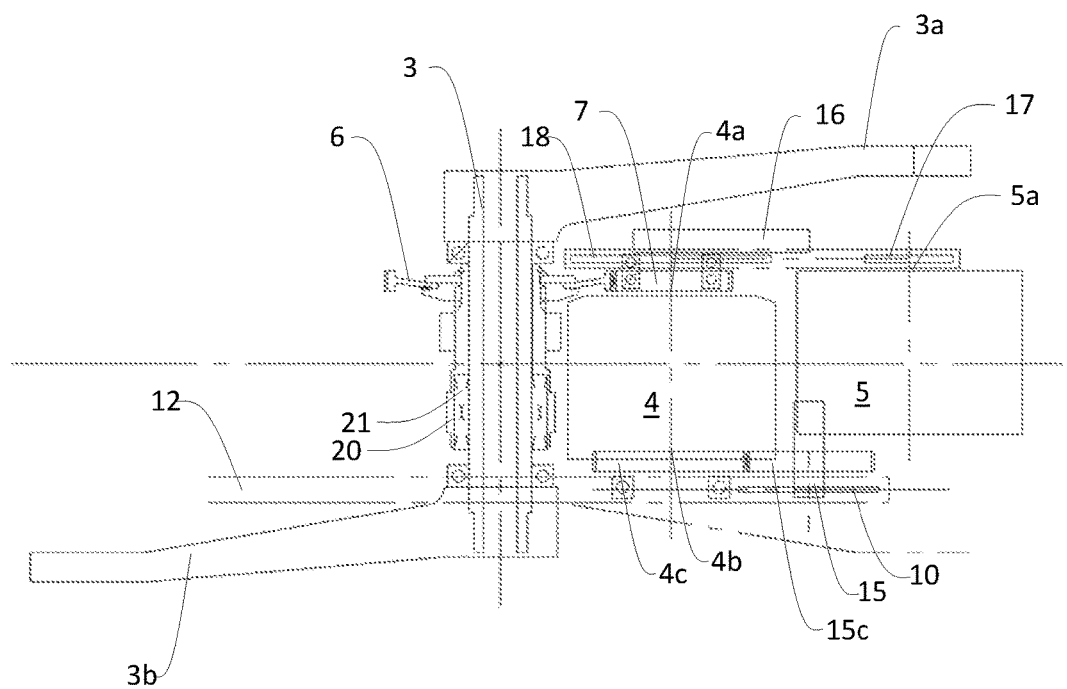
FIG. 2 illustrates in a diagrammatic top view the same embodiment as in FIG. 1. Please note that the diagram has been flattened to better illustrate the individual components.

In a first embodiment EM 1, the invention is a pedally propelled vehicle drive train (1), e.g, as illustrated in FIGS. 1 and 2. The drive train comprises a housing (2) comprising:
a crankshaft (3)
an internal gear (4) with co-axial input (4a) and output shafts (4b)
an electric motor (5) with an output shaft (5a), wherein the crankshaft, the input and output shafts of the internal gear and the output shaft of the electric motor are all arranged in parallel.

The internal gear (4) is a multi-speed gear system. Pedal arms (3a, 3b) driving the crankshaft are illustrated in FIG. 2.

EM 2. The pedally propelled vehicle drive train of EM1, wherein both the crankshaft and the electric motor are arranged to drive the input shaft of the internal gear in the same rotational direction.

EM 3. The pedally propelled vehicle drive train of EM2, comprising a crankshaft wheel (6) coaxial to the crankshaft and an input shaft wheel (7) co-axial to the input shaft of the internal gear, wherein the crankshaft wheel is configured to drive the input shaft wheel.

EM 4. The pedally propelled vehicle drive train of EM3, wherein the crankshaft wheel and the input shaft wheel are configured to rotate in opposite directions.

EM 5. The pedally propelled vehicle drive train of EM4, wherein the crankshaft wheel and the input shaft wheel are cog wheels in mesh.

EM 6. The pedally propelled vehicle drive train of any of the embodiments above, comprising a main chain sprocket (10) configured to rotate in an opposite direction relative to the output shaft (4*b*).

EM 7. The pedally propelled vehicle drive train of embodiment 6, wherein the main chain sprocket is arranged non-coaxially with regard to the output shaft (4*a*). EM 8. The pedally propelled vehicle drive train of embodiment 7, comprising a main sprocket axle (15) arranged in parallel with the output shaft, wherein the drive train further comprises an output shaft wheel (4*c*) and a main wheel (15*c*), wherein the output shaft wheel is arranged on the output shaft, and the main wheel is arranged on the sprocket axle.

EM 9. The pedally propelled vehicle drive train of embodiment 8, wherein the output shaft wheel and the main wheel are cog wheels in mesh and rotate in opposite directions.

EM 10. The pedally propelled vehicle drive train of any of the embodiments above, partly comprising a main drive chain (12) running over the main chain sprocket and arranged to interconnect the main chain sprocket with a rear wheel sprocket (13) on the rear wheel of a pedally propelled vehicle where the drive train is installed.

EM 11. The pedally propelled vehicle drive train of EM10, wherein the housing comprises a chain tensioner (11) arranged to tension the main drive chain (12) running over the main chain sprocket.

EM 12. The pedally propelled vehicle drive train of EM11, wherein the chain tensioner comprises a first tensioner sprocket (11*a*) arranged co-axial with the crank shaft.

EM 13. The pedally propelled vehicle drive train of EM11 or EM12, wherein the chain tensioner comprises a second tensioner sprocket (11*b*) arranged below the crank shaft.

EM 14. The pedally propelled vehicle drive train of any of the embodiments above, comprising a crank sleeve (20) arranged coaxially outside the crank shaft and a one-way clutch (21) configured to allow the crankshaft to rotate the crank sleeve in one rotational direction and freewheel in the opposite rotational direction.

EM 15. The pedally propelled vehicle drive train of EM14, wherein the one-way clutch is arranged inside the crank sleeve.

As a first alternative to the embodiments EM 14 and EM 15, the one-way clutch is arranged between the input shaft wheel (7) and the input shaft (4*a*).

EM 16. The pedally propelled vehicle drive train of EM14 or EM15, wherein the one-way clutch is a sprag clutch.

EM 17. The pedally propelled vehicle drive train of any of EM 14 to EM 16, wherein the crankshaft wheel (6) is arranged rotationally fixed to the crank sleeve (20).

Overload may be a major problem related to a drive system of a pedally propelled vehicle. Although overload may not be directly caused by the rider pushing to hard on the pedals, other aspects, such as running a crank arm into an obstacle etc, may cause harmful peak torques to the driveline. The torque limiter according to the embodiments below is momentaneous and arranged early in the driveline to protect as many of the components as possible. Further, it is self-healing directly after the incident, and allows continuous operation when the peak torque has dropped below a pre-defined torque limit.

EM 18. The pedally propelled vehicle drive train of any of the embodiments EM3 to EM 17, comprising a torque limiter wherein the torque limiter is configured to rotationally fix the crankshaft wheel (6) to the crank sleeve (20) below a torque limit, and rotationally release the crankshaft wheel (6) from the crank sleeve (20) above the torque limit.

EM 19. The pedally propelled vehicle drive train of EM18, wherein the crankshaft wheel (6) comprises first rachet teeth (31*a*) arranged radially.

EM 20. The pedally propelled vehicle drive train of EM19, comprising second rachet teeth (32*a*) arranged radially fixed to the crank sleeve (20), wherein the first and second rachet teeth (31*a*) faces each other in the longitudinal direction of the crank shaft (3).

EM 21. The pedally propelled vehicle drive train of EM20, comprising a disk spring (33) configured to push the first and second ratchet teeth (31*a*, 32*a*) against each other.

EM 22. The pedally propelled vehicle drive train of any of the embodiments EM18 to EM22, wherein the crankshaft wheel comprises a first axial trust face (31*b*).

EM 23. The pedally propelled vehicle drive train of EM22, comprising a second axial trust face (32*b*), arranged radially fixed to the crank sleeve (20), wherein the first and second axial thrust faces (31*b*, 32*b*) faces each other in the longitudinal direction of the crank shaft (3).

EM 24. The pedally propelled vehicle drive train of any of the embodiments EM18 to EM23, wherein the crankshaft wheel (6) comprises a first radial trust face (31*c*).

EM 25. The pedally propelled vehicle drive train of EM24, comprising a second radial trust face (32*c*), arranged radially fixed to the crank sleeve (20), wherein the first and second radial thrust faces (31*c*, 32*c*) faces each other in the radial direction of the crank shaft (3).

EM 26. The pedally propelled vehicle drive train of EM25, comprising a ratchet sleeve (32) arranged coaxially fixed to the crank sleeve (20), wherein the ratchet sleeve comprises the second ratchet teeth (32*a*), the second axial trust face (32*b*), and the first radial thrust face (32*c*).

EM 26a. The pedally propelled vehicle drive train of any of the embodiments EM18 to EM25, comprising a locking ring (39) configured to lock the disc spring in a longitudinal position of the crank shaft (3).

EM 27. The pedally propelled vehicle drive train of any of the embodiments EM18 to EM26a, wherein the torque limit is above any of the torque values 50 Nm, 70 Nm, 100 Nm, 120 Nm, 150 Nm, 200 Nm.

EM 28. The pedally propelled vehicle drive train of any of the embodiments EM18 to EM27, wherein disk spring pushes the first and second ratchet teeth (31*a*) against each other with a force of at least any of the force values 3000N, 5000N, 7000N, 10000N, 12000N, 15000N, 20000N.

EM 29. The pedally propelled vehicle drive train of any of the embodiments EM14 to EM28, comprising a torque sensor (36), configured to sense a torque between the crank shaft (3) and the crank sleeve (20).

EM 30. The pedally propelled vehicle drive train of EM29, wherein the torque sensor is a magnetic torque sensor.

As a second alternative to the embodiments EM 14 and EM 15, the one-way clutch is arranged between the ratchet sleeve (32) and the crank sleeve (20).

EM 31. The pedally propelled vehicle drive train of any of the embodiments above, comprising a motor wheel (17) and an input wheel (18), wherein the motor wheel (17) is arranged on the output shaft (5a) of the electric motor, and the input wheel (18) is arranged on the input shaft (4a) of the internal gear.

EM 32. The pedally propelled vehicle drive train of any of EM31, comprising a second drive chain (14) interconnecting the motor wheel and the input wheel.

EM 33. The pedally propelled vehicle drive train of any of EM31 or EM32, comprising a second one-way clutch configured to allow the input wheel (18) to rotate the input shaft in one rotational direction and freewheel in the opposite rotational direction.

EM 34. The pedally propelled vehicle drive train of EM33, wherein the second one-way clutch is arranged in an inner radius of the input wheel (18).

EM 35. The pedally propelled vehicle drive train of EM33 or 34, wherein the second one-way clutch is a sprag clutch.

EM 36. The pedally propelled vehicle drive train of any of the embodiments above, wherein the housing is oil-filled.

EM 37. The pedally propelled vehicle drive train of any of the embodiments above, wherein the internal gear comprises one or more planetary gear sets.

In a dependent embodiment the motor wheel (17) is connected to a planet carrier of the planetary gear.

In a second dependent embodiment the output shaft (5a) of the motor is driving a sun wheel of the planetary gear set.

EM 38. The pedally propelled vehicle drive train of any of the embodiments above, comprising a gear shifter (16) arranged to shift gears inside the internal gear, e.g, by rotating a shift axle inside the internal gear.

EM 39. The pedally propelled vehicle drive train of any of the embodiments EM32 to EM 38 above, comprising a second chain tensioner (19) configured to tension the second drive chain (14).

In a first dependent embodiment the pedally propelled vehicle drive train comprises a cover arranged to cover the chain tensioner and interact with the tensioner, wherein the chain tensioner tensions the second drive chain when the cover is mounted to the housing (2) and un-tension the second drive chain when the cover is un-mounted.

In a second dependent embodiment the cover is configured to connect with the motor wheel (17) before reaching its final position when mounted.

In a third dependent embodiment the cover comprises an axle or shaft extending from the cover configured to enter into a through hole of a rotational bearing fixed to the motor wheel (17).

In FIGS. 1 and 2 a specific embodiment of the pedally propelled vehicle drive train is illustrated. FIG. 1 is a partly transparent schematic side view, where the main elements of the drive train have been included. FIG. 2 is a partly transparent top section view illustrating the same elements as in FIG. 1. The crankshaft (3) comprises first and second pedal arms (3a. 3b). Further, the crankshaft (3), the internal gear (4) and it's input and output shafts (4a, 4b) and the electric motor (5) and electronic motor output shaft (5a) are all arranged in parallel. The housing (2) is configured to be mounted in the frame of a pedally propelled vehicle. The main drive chain (12) interconnects the drive train and a rear wheel sprocket (13) of a wheel of the vehicle in order to drive the wheel when driving torque is applied on the main chain sprocket of the drive train. The drive train comprises a chain tensioner (11) comprising a first tensioner sprocket (11a) arranged freely rotating about the crank axle (3), and a second tensioner sprocket (11b) arranged on a spring-loaded link arm (11c). In the drive direction, indicated by the stapled line in FIG. 1, the upper part of the main drive chain (12) runs from the rear wheel sprocket, over and partially around the main chain sprocket (10). Further it runs over the first tensioner sprocket (11a) and below the second tensioner sprocket (11b) before returning to the rear wheel sprocket.

When torque is applied to the main chain sprocket (10), the upper part of drive chain is tensioned, while the slack of the lower part is taken up by the chain tensioner.

The main chain sprocket (10) is arranged on a ball bearing on the main sprocket axle (15), which is arranged fixed to the housing (2). The main chain sprocket (10) is further rotationally fixed to a main wheel (15c) arranged inside and coaxial with the main chain sprocket (10) on the main sprocket axle (15). An output shaft wheel (4c) arranged on the output shaft (4b) of the internal gear meshes with the main wheel (15), i.e. these wheels are both cog-wheels. Thus, the main chain sprocket (10) is directly driven by the output shaft (4b). With the current configuration the main chain sprocket rotates in the opposite direction of the output shaft.

The input shaft (4a) of the internal gear can be driven from the crank shaft (3) or from the electric motor (5) or from both at the same time.

The electric motor (5) is arranged above the crankshaft and the internal gear. A motor wheel (17) on the motor output shaft (5a) is connected to an input wheel (18) arranged coaxially with the input axle (4a) and one-way rotationally connected to the input axle with a second one-way clutch. A second drive chain (14) is connecting the motor wheel (17) to the input wheel (18). The second one-way clutch arranged radially between the input wheel (18) and the input axle (4a) allows the motor to drive the input axle (4a) but not the input axle to drive the motor.

In the same way, the crank shaft (3), can drive the input axle (4a) in one rotational direction, which is the same direction the motor can drive the input axle.

A crankshaft wheel (6) is one-way rotationally connected to the crankshaft (3) via a one way clutch arranged radially between the crankshaft (3) and the crankshaft wheel (6). The crankshaft wheel (6) meshes with an input shaft wheel (7) connected to the input shaft (4a) of the internal gear (4) and arranged axially inside the input wheel (18).

Figure 3:
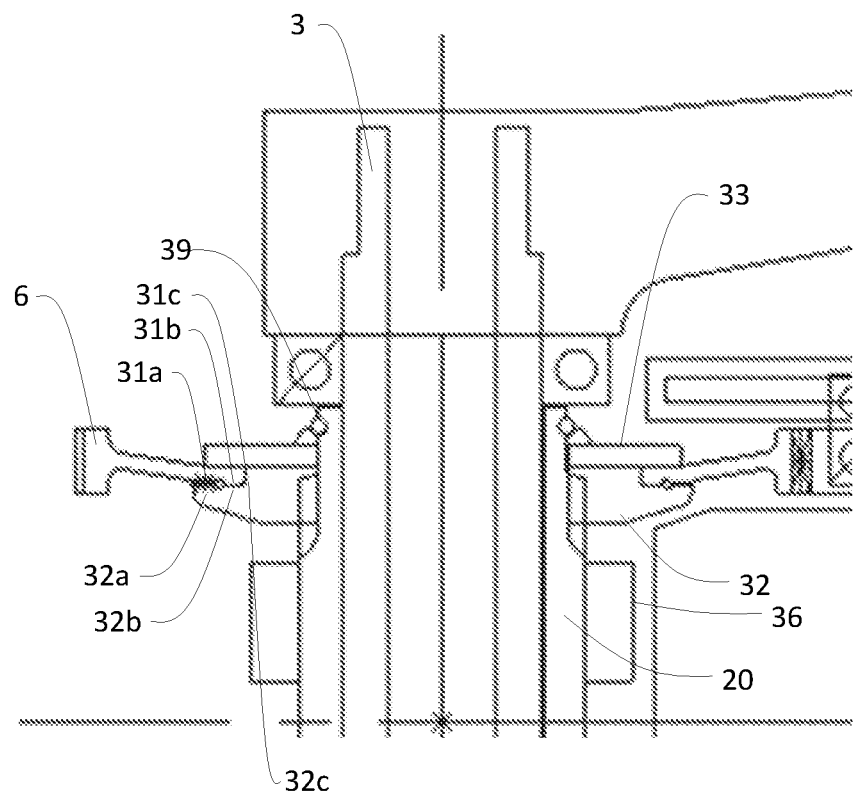
FIG. 3 illustrates in a detailed schematic view an embodiment of the torque limiter.

The pedally propelled vehicle drive train of FIG. 1 and FIG. 2 further comprises a torque limiter illustrated in more detail in FIG. 3. The torque limiter prevents the crankshaft from overloading the internal components.

The first crankshaft wheel (6) comprises first ratchet teeth (31a) arranged radially and facing respective second ratchet teeth (32a) arranged radially on the first end of a crank sleeve (20). The crank sleeve has a cylindrical shape and is arranged outside the crank shaft (3). Further, the crank sleeve is fixed to the crank shaft (3) in a second end, opposite the first end.

A disc spring (31) kept in place by a locking ring (39) fixed to the crank sleeve (20) pushes the crankshaft wheel (6) against the input shaft wheel (7), making sure that the first and second ratchet teeth of the torque limiter are in mesh as long as the torque across the torque limiter is below a designed value given by the resilience of the disc spring. If the torque is above the designed value, the disc spring will allow the ratchet teeth to ratchet relative each other in order to protect the components after the crank drive, such as the internal gear, sprag clutches etc.

The crankshaft wheel (6) is axially and radially supported by a first axial trust face (31b) supported by a second axial thrust face (32b) and by a first radial trust face (31c) supported by a second radial thrust face (32c), respectively on the ratchet sleeve (32).

Figure 4:
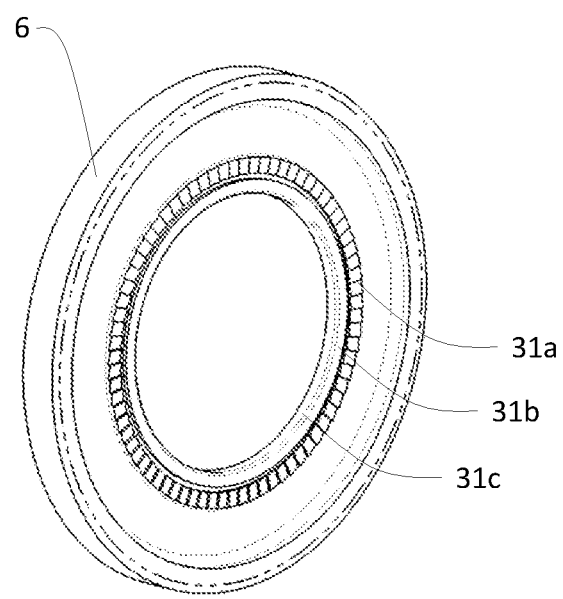
FIG. 4 illustrates an embodiment of the crankshaft wheel (6) configured to constitute an element of the torque limiter. Cogs for meshing with the input shaft wheel (7) illustrated in FIG. 2 have not been indicated but may be arranged on the circumference of the wheel.

The first ratchet teeth (31a), the first axial trust face (31b) and first radial trust face (31c) of the crankshaft wheel are illustrated in FIG. 4.

A magnetic torque sensor (36) is arranged outside, and between the first and second ends of the crank sleeve (20) and configured to sense a torque between the crank shaft (3) and the crank sleeve (20).

Figure 5:
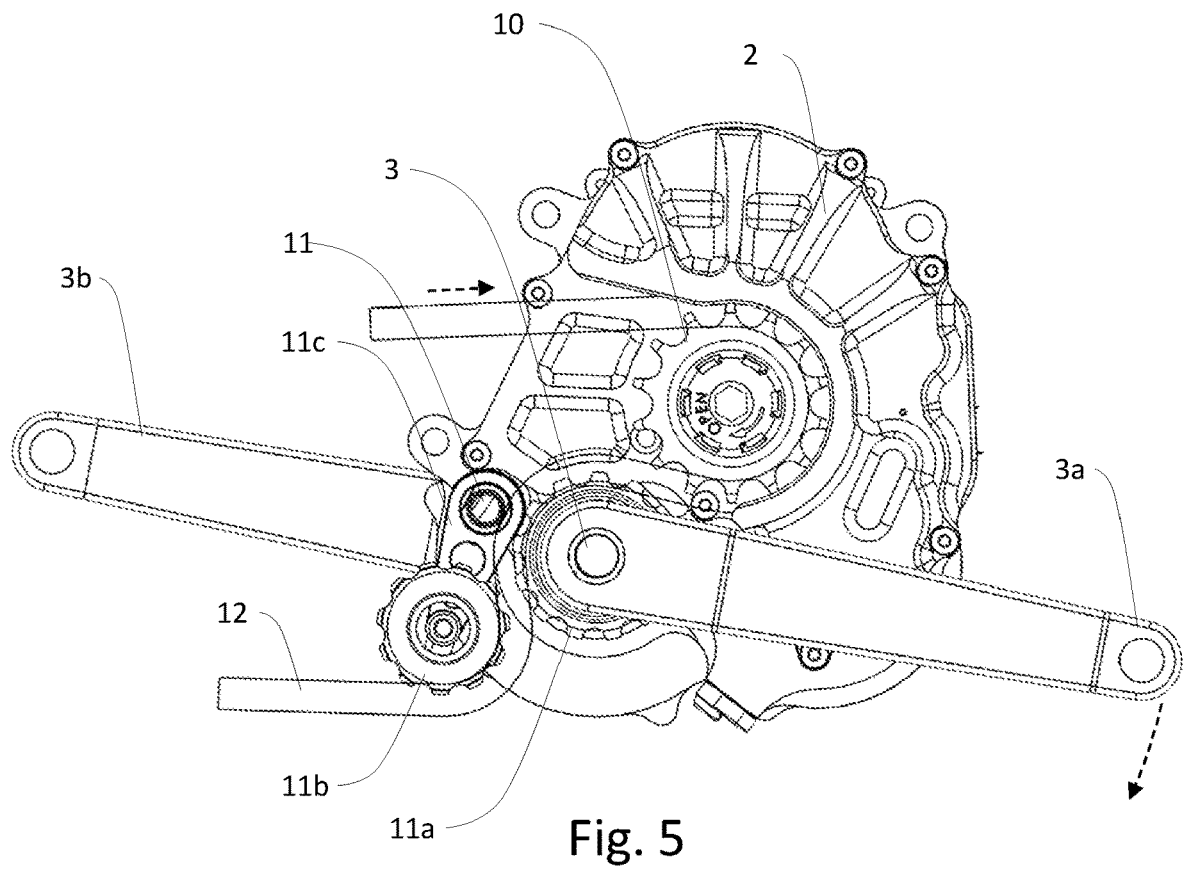
FIGS. 5 and 6 illustrates in opposite side views an embodiment of the vehicle drive system.
Figure 6:
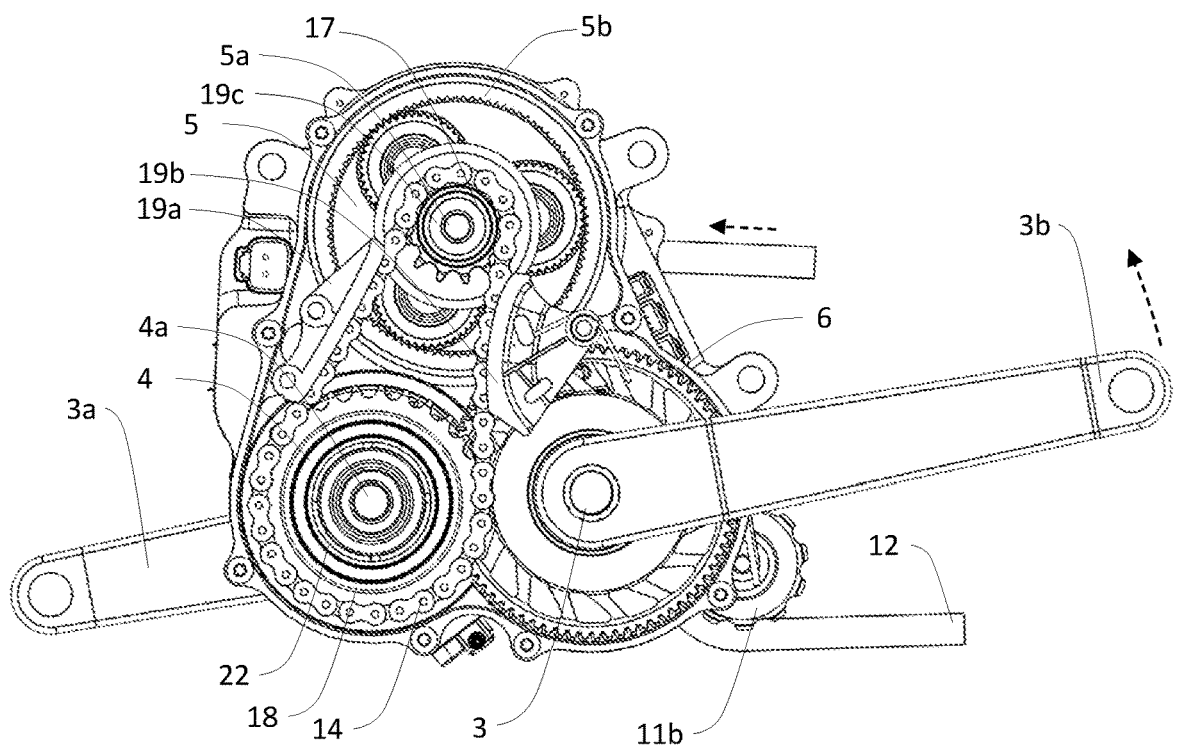

In a specific embodiment of the pedally propelled vehicle drive train illustrated in opposite first and second side views in FIGS. 5 and 6, it can be seen that the crankshaft (3) comprises first and second pedal arms (3a. 3b). Further, the crankshaft (3), the internal gear (4) and it's input and output shafts (4a. 4b) and the electric motor (5) and electronic motor output shaft (5a) are all arranged in parallel. The housing (2) is configured to be mounted in the frame of a pedally propelled vehicle. The main drive chain (12) interconnects the drive train and a rear wheel sprocket of a wheel of the vehicle in order to drive the wheel when driving torque is applied on the main chain sprocket of the drive train. The internal gear is a multi-speed gear system, and may be e.g, an adaptation of a gear system as disclosed in WO2020130841 A1.

In the first side view of FIG. 5, which can be seen as the output drive side, we can see that the chain tensioner (11) is an integrated part of the drive train, which means that no additional chain tensioner is needed externally, and that installation and maintenance related work can be reduced. In most prior art the chain tensioner is located close to the rear wheel sprocket or hub or mounted as a separate tensioner in the crank area.

The chain tensioner comprises a first tensioner sprocket (11a) arranged freely rotating about the crank axle (3), and a second tensioner sprocket (11b) arranged on a spring-loaded link arm (11c). In the drive direction, indicated by the stapled lines, the upper part of the main drive chain (12) runs from the rear wheel sprocket, over and partially around the main chain sprocket (10). Further it runs over the first tensioner sprocket (11a) and below the second tensioner sprocket (11b) before returning to the rear wheel sprocket.

When torque is applied to the main chain sprocket (10), the upper part of drive chain is tensioned, while the slack of the lower part is taken up by the chain tensioner. The chain tensioner may be protected by a cover mounted to the housing.

The second side view shown in FIG. 6, illustrates many of the input drive elements of the drive train. Starting from the crank shaft (3), a crankshaft wheel (6) one-way rotationally connected to the crankshaft via a one way clutch, meshes with an input shaft wheel connected to the input shaft (4a) of the internal gear (4). The input shaft wheel is rotationally connected to—and co-axial with the input shaft (4a). In FIG. 6 it is hidden behind the input wheel (18). The crankshaft can drive the input shaft of the internal gear, but it cannot be driven by the input shaft. Further, the crank shaft freewheels in the direction opposite to the drive direction.

The electric motor (5) is arranged above the crankshaft and the internal gear. The motor output shaft (5a) is connected to a first reduction gear (5c) being a planetary gear. The rotational speed of the output shaft (5a) is reduced before connected to the internal gear. The output of the first reduction gear is the planet carrier of the planetary gear, where the planet carrier is fixed to a motor wheel (17). A second drive chain (14) is connecting the motor wheel (17) to an input wheel (18) arranged coaxially with the input axle (4a) and one-way rotationally connected to the input axle with a second one-way clutch (22). The second one-way clutch allows the motor to drive the input shaft of the internal gear, but it prevents it to be driven by the input shaft.

FIG. 6 further illustrates a second chain tensioner (19) with first and second chain guides (19a. 19b) arranged to push the second drive chain towards the center from respective sides. The first chain guide is static, while the second chain guide is spring loaded towards a cover not shown.

The motor wheel (17) comprises a rotational bearing (19c) in its center. The inner part of the rotational bearing has a through hole. To hide the mechanical parts, a cover not shown here, is mounted from the side, i.e. towards the plane of the drawing. The cover comprises a fixed shaft that penetrates into the through hole of the rotational bearing and supports the motor wheel (17) and the planet carrier when fixed to the housing. Since the planet carrier has some slack, the rotational bearing will drop towards the input shaft (4a) when the rotational bearing has no support in the cover. In this position it will be no tension in the chain, allowing for easy assembly of the chain. The fixed shaft has a tapered end that can easily enter into the center of the rotational bearing when mounting the cover, and since the rotational bearing is now supported by the axle, the final mounting of the cover in its proper position will require the rotational bearing (19c) to be moved away from the input shaft (4a) and the second drive chain to be tensioned the required amount. The torsion spring tensioning the second chain guide has a free end that is easily arranged inside the cover before pressing the cover into final position.

Both one-way clutches (21, 22) are sprag clutches.

A gear shifter in the form of an electric actuator is arranged behind the first pedal arm (3a) and the cover in FIG. 5 and configured to rotate a shift axle in the internal gear (4).

In the exemplary embodiments, various features and details are shown in combination. The fact that several features are described with respect to a particular example should not be construed as implying that those features by necessity have to be included together in all embodiments of the invention. Conversely, features that are described with reference to different embodiments should not be construed as mutually exclusive. As those with skill in the art will readily understand, embodiments that incorporate any subset of features described herein and that are not expressly interdependent have been contemplated by the inventor and are part of the intended disclosure. However, explicit description of all such embodiments would not contribute to the understanding of the principles of the invention, and consequently some permutations of features have been omitted for the sake of simplicity or brevity.

The invention claimed is:

1. A pedally propelled vehicle drive train comprising:
a housing;
a crankshaft;
an internal multi-speed gear with co-axial input and output shafts; and
an electric motor with an output shaft,
wherein the crankshaft, the input and output shafts of the internal multi-speed gear and the output shaft of the electric motor are all arranged in parallel,
wherein the crankshaft and the electric motor are arranged to drive the input shaft of the internal multi-speed gear in the same rotational direction.

2. The pedally propelled vehicle drive train of claim 1, further comprising a main chain sprocket configured to rotate in an opposite direction relative to the output shaft of the internal multi-speed gear.

3. The pedally propelled vehicle drive train of claim 2, further comprising a second drive chain interconnecting the electric motor and the input shaft of the internal multi-speed gear.

4. The pedally propelled vehicle drive train of claim 2, wherein the housing comprises a chain tensioner arranged to tension a main drive chain running over the main chain sprocket.

5. The pedally propelled vehicle drive train of claim 4, further comprising a second drive chain interconnecting the electric motor and the input shaft of the internal multi-speed gear.

6. The pedally propelled vehicle drive train of claim 4, wherein the chain tensioner comprises a first tensioner sprocket arranged co-axial with the crank shaft.

7. The pedally propelled vehicle drive train of claim 6, further comprising a second drive chain interconnecting the electric motor and the input shaft of the internal multi-speed gear.

8. The pedally propelled vehicle drive train claim 1, further comprising a second drive chain interconnecting the electric motor and the input shaft of the internal multi-speed gear.

9. The pedally propelled vehicle drive train claim 1, wherein the housing is oil-filled.

10. The pedally propelled vehicle drive train of claim 1, further comprising a crankshaft wheel coaxial to the crankshaft and an input shaft wheel co-axial to the input shaft of the internal multi-speed gear,
wherein the crankshaft wheel is configured to drive the input shaft wheel.

11. The pedally propelled vehicle drive train of claim 10, wherein the crankshaft wheel and the input shaft wheel are cog wheels in mesh.

12. The pedally propelled vehicle drive train of claim 11, further comprising a main chain sprocket configured to rotate in an opposite direction relative to the output shaft of the internal multi-speed gear.

13. The pedally propelled vehicle drive train of claim 11, further comprising a second drive chain interconnecting the electric motor and the input shaft of the internal multi-speed gear.

14. The pedally propelled vehicle drive train claim 10, further comprising a torque limiter configured to rotationally fix the crankshaft wheel to a crank sleeve below a torque limit, and rotationally release the crankshaft wheel from the crank sleeve above the torque limit.

15. The pedally propelled vehicle drive train of claim 10, further comprising a main chain sprocket configured to rotate in an opposite direction relative to the output shaft of the internal multi-speed gear.

16. The pedally propelled vehicle drive train of claim 10, further comprising a second drive chain interconnecting the electric motor and the input shaft of the internal multi-speed gear.

17. The pedally propelled vehicle drive train of claim 1, further comprising a main chain sprocket configured to rotate in an opposite direction relative to the output shaft of the internal multi-speed gear.

18. The pedally propelled vehicle drive train of claim 1, further comprising a second drive chain interconnecting the electric motor and the input shaft of the internal multi-speed gear.

19. The pedally propelled vehicle drive train of claim 1, wherein the housing is oil-filled.

* * * * *